United States Patent
Miyake et al.

(10) Patent No.: US 11,568,701 B2
(45) Date of Patent: Jan. 31, 2023

(54) CASH HANDLING APPARATUS

(71) Applicant: FUJITSU FRONTECH LIMITED, Tokyo (JP)

(72) Inventors: Toshimasa Miyake, Inagi (JP); Masanori Ohkawa, Inagi (JP); Mitsuo Watanabe, Inagi (JP); Nobuhiro Matsui, Inagi (JP)

(73) Assignee: FUJITSU FRONTECH LIMITED, Inagi (JP)

( * ) Notice: Subject to any disclaimer, the term of this patent is extended or adjusted under 35 U.S.C. 154(b) by 214 days.

(21) Appl. No.: 16/984,390

(22) Filed: Aug. 4, 2020

(65) Prior Publication Data

US 2020/0364966 A1  Nov. 19, 2020

Related U.S. Application Data

(63) Continuation of application No. PCT/JP2018/007212, filed on Feb. 27, 2018.

(51) Int. Cl.
*G07D 11/40* (2019.01)
*F16M 13/02* (2006.01)

(52) U.S. Cl.
CPC .......... *G07D 11/40* (2019.01); *F16M 13/022* (2013.01); *G07D 2201/00* (2013.01); *G07D 2211/00* (2013.01)

(58) Field of Classification Search
CPC .... G07D 11/40; G07D 11/10; G07D 2211/00; G07D 2201/00
See application file for complete search history.

(56) References Cited

U.S. PATENT DOCUMENTS

| | | | | |
|---|---|---|---|---|
| 8,480,076 | B2* | 7/2013 | Staff | G07F 19/20 271/145 |
| 8,579,278 | B2* | 11/2013 | Arikata | G07D 11/40 271/9.12 |
| 10,083,563 | B2* | 9/2018 | Yang | G07F 19/00 |
| 2003/0000957 | A1 | 1/2003 | Brexel et al. | |
| 2015/0230605 | A1* | 8/2015 | Miyake | A47B 88/57 312/334.44 |
| 2015/0307306 | A1* | 10/2015 | Kadota | B65H 5/06 271/3.19 |
| 2018/0165907 | A1 | 6/2018 | Yang | |

FOREIGN PATENT DOCUMENTS

| | | |
|---|---|---|
| EP | 490096 A2 | 6/1992 |
| EP | 490096 A3 | 6/1992 |
| EP | 3333813 B1 | 8/2019 |

(Continued)

OTHER PUBLICATIONS

Office action issued in corresponding Canadian patent application No. 3090369, dated Sep. 29, 2021.

(Continued)

*Primary Examiner* — Patrick H Mackey
(74) *Attorney, Agent, or Firm* — Greer Burns & Crain Ltd.

(57) ABSTRACT

A cash handling apparatus includes a composite body that consists of a plurality of connected modules, slide rails with which the composite body is drawn out of a housing, and a holding part that is fixed to two or more adjacent surfaces among four outer surfaces of the composite body and holds the plurality of modules together.

5 Claims, 11 Drawing Sheets (56) References Cited

FOREIGN PATENT DOCUMENTS

| | | |
|---|---|---|
| JP | 2003521051 A | 7/2003 |
| JP | 2003308557 A | 10/2003 |
| JP | 2004240921 A | 8/2004 |
| JP | 2011007302 A | 1/2011 |
| JP | 54072047 B2 | 4/2014 |
| JP | 2014123222 A | 7/2014 |
| TW | 1607416 B | 12/2017 |

OTHER PUBLICATIONS

ISR issued in Int'l. Application No. PCT/JP2018/007212, dated Jun. 5, 2018.
EESR issued in corresponding EP patent application No. 18 908 228.2, dated Sep. 10, 2021.
Office action issued in corresponding Canadian patent application No. 3090369, dated Jul. 20, 2022.

\* cited by examiner

CASH HANDLING APPARATUS

CROSS-REFERENCE TO RELATED APPLICATION

This application is continuation application of International Application PCT/JP2018/007212 filed on Feb. 27, 2018 and designated the U.S., the entire contents of which are incorporated herein by reference.

FIELD

The aspects described herein are related to a cash handling apparatus for performing processes such as reception and ejection of bills or coins.

BACKGROUND

To easily and safely perform tasks such as maintenance of a heavy object mounted on a cash handling apparatus, slide rails with which the heavy object can be temporarily removed from the apparatus and then returned thereto have conventionally been used. As examples of such slide rails, two slide rails provided at different heights are known wherein the slide rail provided on the side for operation of attaching or detaching a storage cassette is located at the lower position (see, for example, Japanese Patent No. 5472047).

SUMMARY

In one aspect, a cash handling apparatus includes a composite body that consists of a plurality of connected modules, slide rails with which the composite body is drawn out of the housing, and a holding part that is fixed to two or more adjacent surfaces among four outer surfaces of the composite body and holds the plurality of modules together.

The object and advantages of the invention will be realized by means of the elements and combinations particularly pointed out in the claims.

DESCRIPTION OF EMBODIMENTS

In the meantime, slide rails are fixed to a heavy object by, for example, screws, and in a closing/opening operation, a stopper mechanism provided for the slide rails limits the amount of opening/closing. As a general rule, a withstand load is set for the slide rails, and no problems will be likely to occur as long as a heavy object exceeding such a load is not mounted. However, when a heavier object is mounted, or when the closing/opening speed is higher, a greater impact will be given by an inertial force when the heavy object is stopped at the fully open position or fully closed position of the slide rails.

Accordingly, when the heavy object is a composite body consisting of a plurality of connected modules, an impact resulting from an inertial force applied to the modules other than those held by the slide rails while opening or closing the slide rails could apply a load to, and thus break, the linkages between the modules. The composite body could swing in a lateral direction orthogonal to the open-close direction of the slide rails and could be broken as a result of striking the inner wall of the housing accommodating the composite body.

The following describes a cash handling apparatus in accordance with an embodiment of the present invention by referring to the drawings. The present embodiment will be described with reference a bill reception-ejection apparatus 1, i.e., an example of the cash handling apparatus. However, the cash is not limited to bills but may be coins, and the handling of cash is not limited to reception and ejection of cash but may be other types of handling, such as those that include only ejection or reception of cash.

Figure 1:
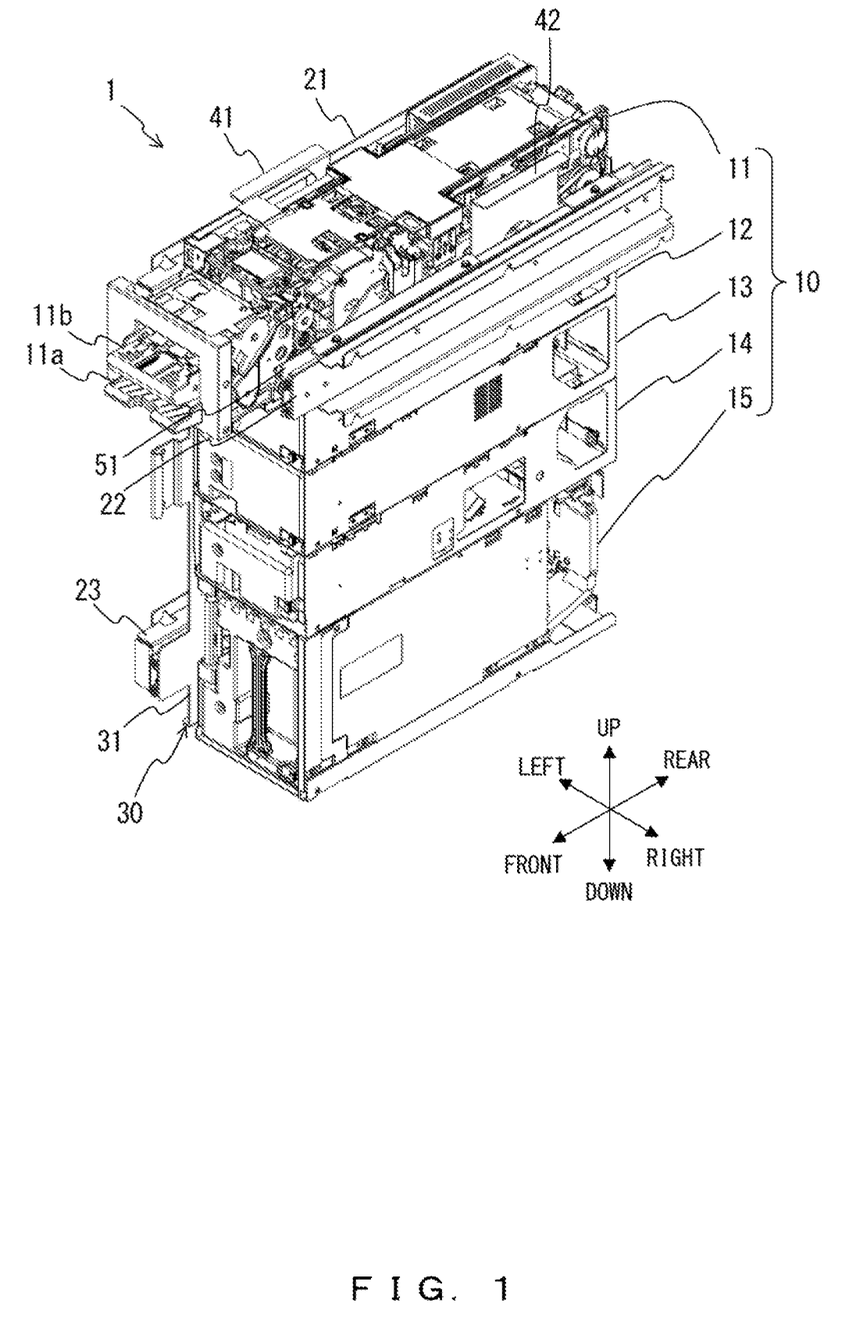
FIG. 1 is a front perspective view illustrating a bill reception-ejection apparatus in a slide-rail fully closed state.

FIG. 1 is a front perspective view illustrating the bill reception-ejection apparatus 1 with first to third slide rails 21 to 23 in a fully closed state.

FIGS. 2-5 are a front perspective view, a back perspective view, a left side view, and a bottom view each illustrating the bill reception-ejection apparatus 1 with the first to third slide rails 21 to 23 in the fully open state.

Regarding an up-down direction, a front-rear direction, and a left-right direction indicated in FIGS. 1-5 and FIGS. 6A-6C and FIGS. 7A-7C, which will be described hereinafter, for example, the up-down direction may be a vertical direction, and the front-rear and left-right directions may be a horizontal direction.

Figure 2:
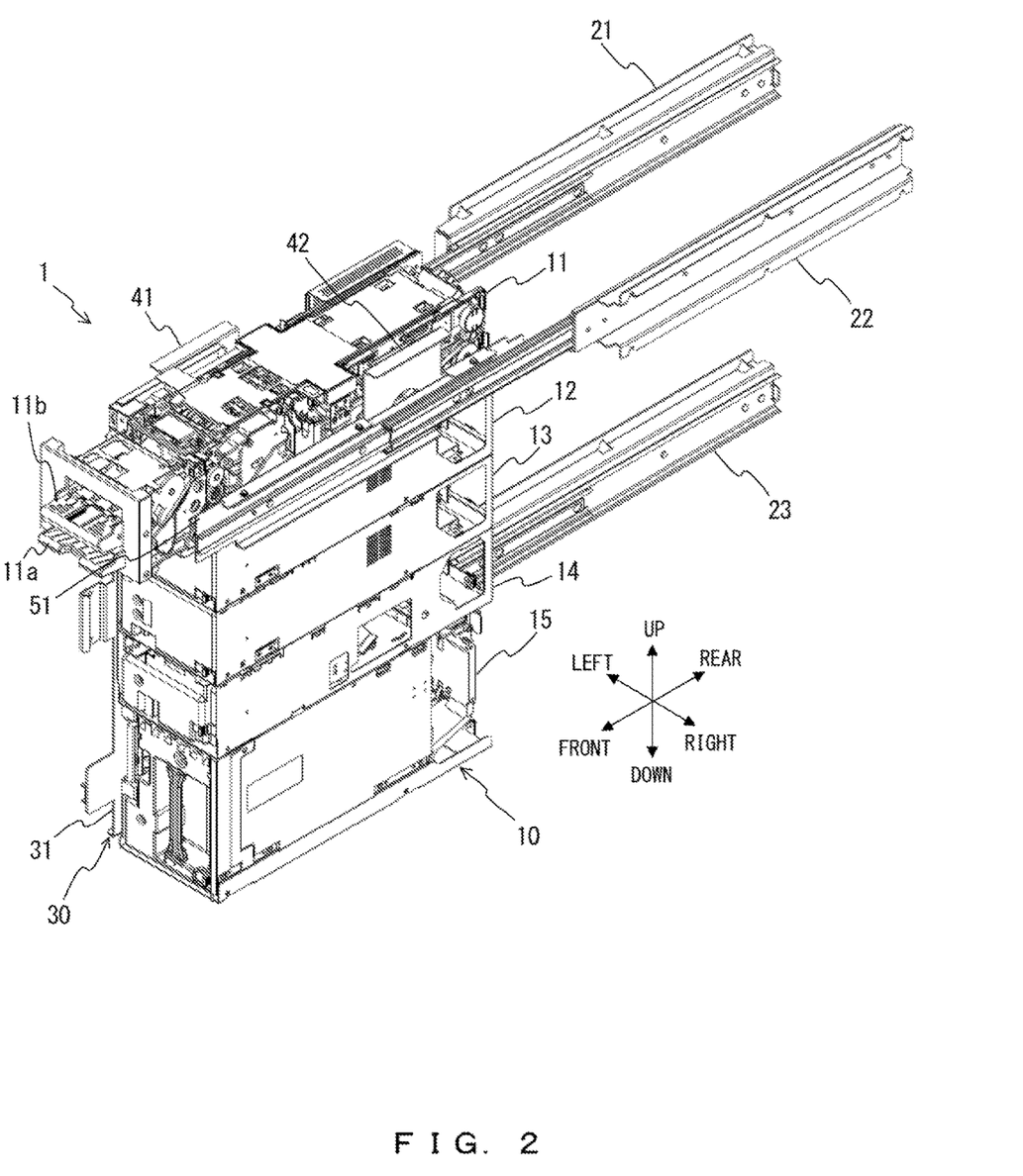
FIG. 2 is a front perspective view illustrating a bill reception-ejection apparatus in a slide-rail fully open state.
Figure 3:
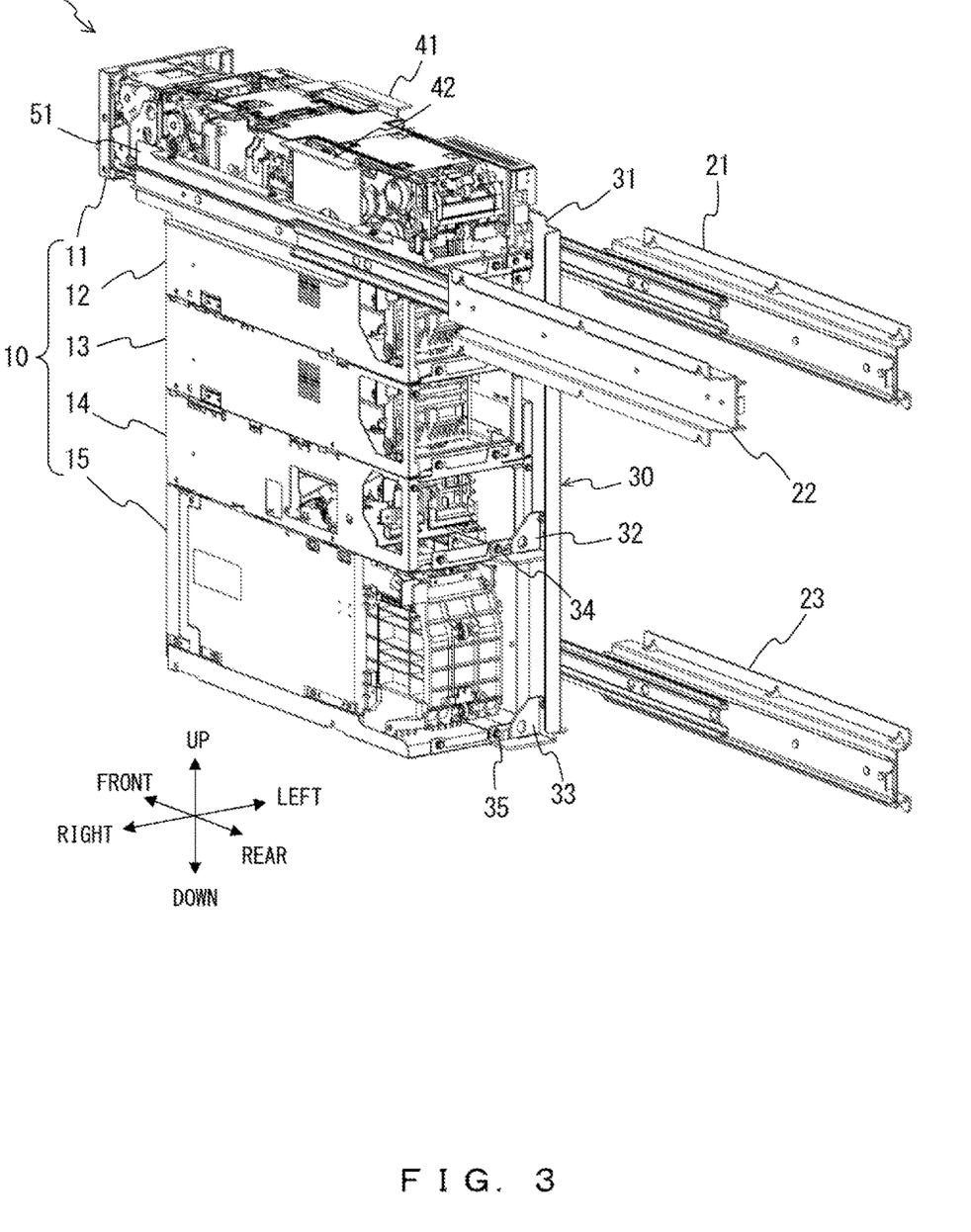
FIG. 3 is a back perspective view illustrating a bill reception-ejection apparatus in a slide-rail fully open state.

The bill reception-ejection apparatus 1 depicted in FIGS. 1-5 includes a composite body 10, a first slide rail 21, a second slide rail 22, a third slide rail 23, a holding part 30, a first grip bracket 41 and a second grip bracket 42, i.e., examples of brackets, and a placement-reception part 51 (see FIG. 3).

The composite body 10 is a heavy object (heavy unit) consisting of a first module 11, a second module 12, a third module 13, a fourth module 14, and a fifth module 15, which are connected in this order from the upper side in a height direction, wherein each of these modules is shaped like a rectangular solid. For example, the first to fifth modules 11 to 15 may be connected such that the bottom and back surfaces of an upper module and the upper and back surfaces of a module directly thereunder are connected. However, any method can be used to connect the modules. As long as the composite body 10 includes a plurality of modules, the composite body 10 may include any type of modules.

Hence, the first to fifth modules 11 to 15 described in the following are merely examples.

The first module 11 is provided with a cash ejector 11*a* protruding forward for ejecting bills and a cash receiver 11*b* protruding forward for receiving bills. The first module also has disposed therein a transportation unit for transporting bills, a validation unit for validating the bills, and the like.

The second module 12 and the third module 13 accommodate bills for withdrawal among received bills. For example, recycle bill accommodation parts (not illustrated) for accommodating bills sandwiched by films in a rolled manner may be disposed inside the front and rear portions of the second module 12 and the third module 13.

The fourth module 14 accommodates bills supplied from outside for withdrawal.

The fifth module 15 accommodates bills that are not to be used for withdrawal among received bills.

Rear end portions of the first slide rail 21, the second slide rail 22, and the third slide rail 23 are fixed to the inner walls of a housing (not illustrated) so as to draw the composite body 10 out of the housing. Any number of slide rails may be provided, but only the three slide rails, namely the first slide rail 21, the second slide rail 22, and the third slide rail 23, will desirably be provided.

As depicted in FIGS. 2 and 3, the first slide rail 21 and the second slide rail 22 are located on opposite sides of the composite body 10. In particular, the first slide rail 21 is located on the left-side-surface side of the composite body 10, and the second slide rail 22 is located on the right-side-surface side of the composite body 10. The third slide rail 23 is located below the first slide rail, i.e., located on the left-side-surface side of the composite body 10.

As depicted in FIG. 3, the holding part 30 is fixed to portions of the right-side surfaces of the first slide rail 21 and the third slide rail 23 on the front-end side. The holding part 30 is also fixed to the left side surface of the composite body 10 (an example of the first surface) and the back surface thereof (an example of the second surface) and holds the first to fifth modules 11 to 15 together. In this way, the holding part 30 may be fixed to two or more adjacent surfaces of the four outer surfaces (left side and right side surfaces, front surface, and back surface) of the composite body 10.

The holding part 30 includes a left-side-surface holding section 31, a back-surface holding section 32, and a back-surface holding section 33.

Figure 4:
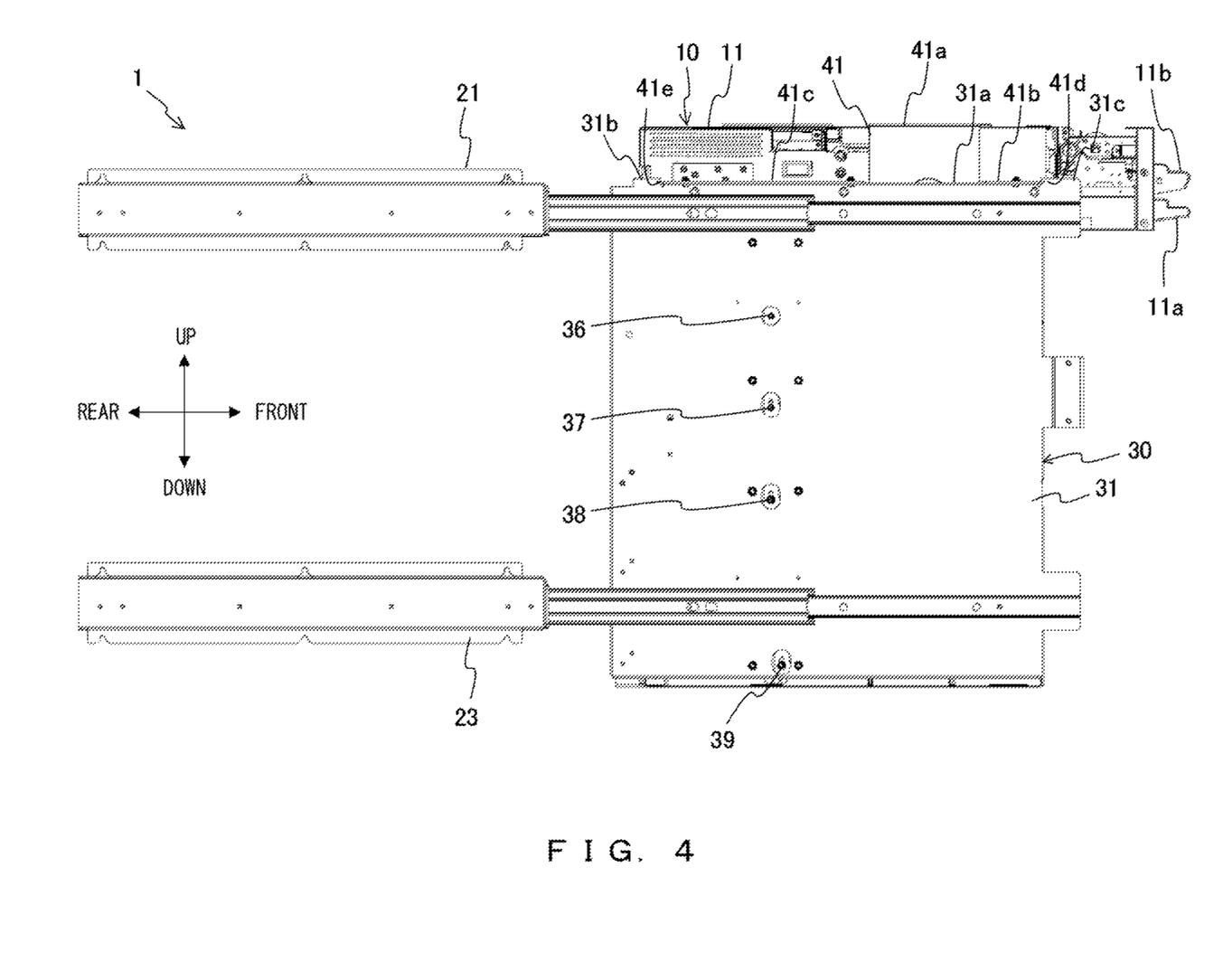
FIG. 4 is a left side view illustrating a bill reception-ejection apparatus in a slide-rail fully open state.
Figure 5:
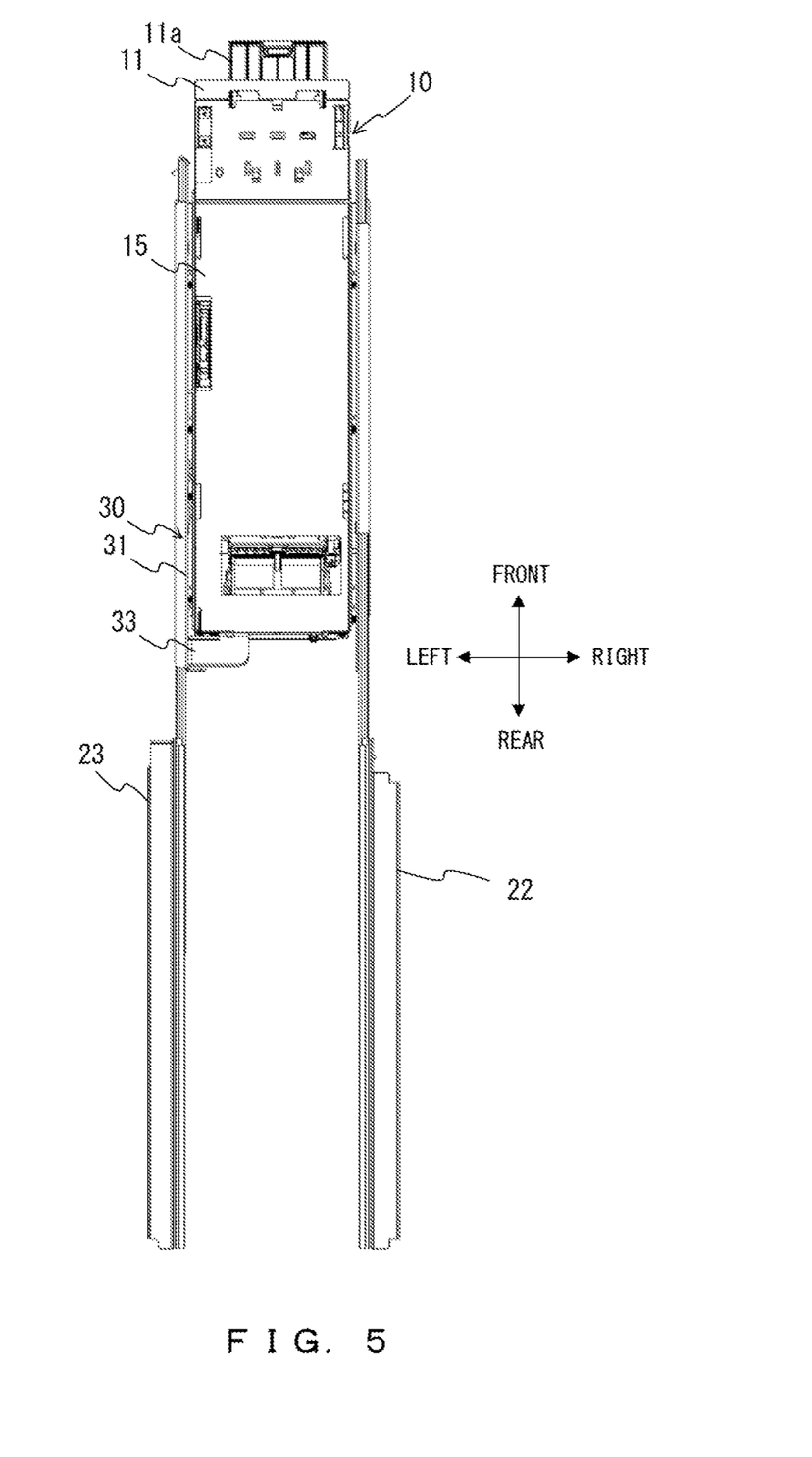
FIG. 5 is a bottom view illustrating a bill reception-ejection apparatus in a slide-rail fully open state.
Figure 6A:
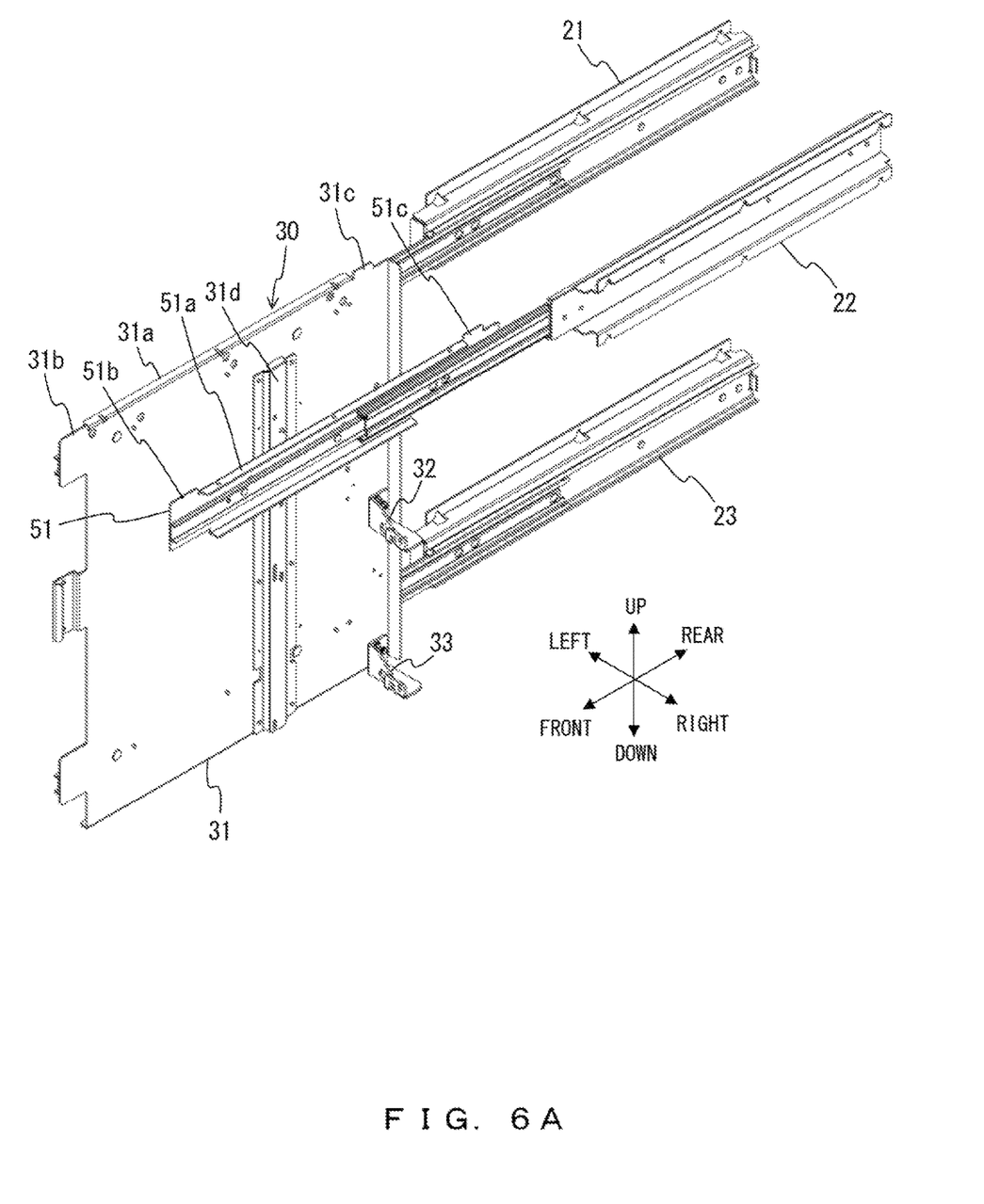
FIG. 6A is a front perspective view illustrating slide rails in a fully open state.

The left-side-surface holding section 31 assumes, as depicted in FIG. 4, a rectangular plate shape covering the left side surfaces of the first to fifth modules 11 to 15. As depicted in FIG. 6A, the left-side-surface holding section 31 includes a placement-reception surface 31*a* on which placement surfaces 41*b* and 41*c* of the first grip bracket 41 (described hereinafter) are placed, catching projections 31*b* and 31*c* protruding upward such that catch sections 41*d* and 41*e* provided on the placement surfaces 41*b* and 41*c* can be caught thereon, and a fixation member 31*d* provided on the right-side surface.

The fixation member 31*d* depicted in FIG. 6A fixes, as depicted in FIG. 4, the left-side-surface holding section 31 to the second module 12 by means of a fixation screw 36, to the third module 13 by means of a fixation screw 37, to the fourth module 14 by means of a fixation screw 38, and to the fifth module 15 by means of a fixation screw 39.

As will be described in detail hereinafter, the left-side-surface holding section 31 has the placement-reception surface 31*a* fixed to the first grip bracket 41 fixed to the first module 11 and is thus fixed indirectly to the first module 11.

As described above, the left-side-surface holding section 31 is fixed to all of the first to fifth modules 11 to 15. The left-side-surface holding section 31 may be fixed at least to the first module 11, i.e., the uppermost module, and the fifth module 15, i.e., the lowermost module.

As depicted in FIG. 3, the back-surface holding section 32 is fixed to the rear edge of the left-side-surface holding section 31 and fixed to the lower edge of the back surface of the fourth module 14 by a fixation screw 34. The back-surface holding section 33 is fixed to the rear edge of the left-side-surface holding section 31 and fixed to the lower edge of the back surface of the fifth module 15 by a fixation screw 35. The modules fixed to the back-surface holding sections 32 and 33 are desirably modules other than the first module 11. This is because the first module 11 is firmly fixed, owing to the first grip bracket 41 and the second grip bracket 42 fixed to the first module 11, to the first slide rail 21 and the second slide rail 22 via the holding part 30 and the placement-reception part 51, as will be described in detail hereinafter. It will be more desirable that the modules fixed to the back-surface holding sections 32 and 33 be modules located distant from the first module 11. For example, the fourth module 14 and the fifth module 15 may be more desirably fixed to the back-surface holding sections 32 and 33 than the second module 12 and the third module 13.

Figure 7A:
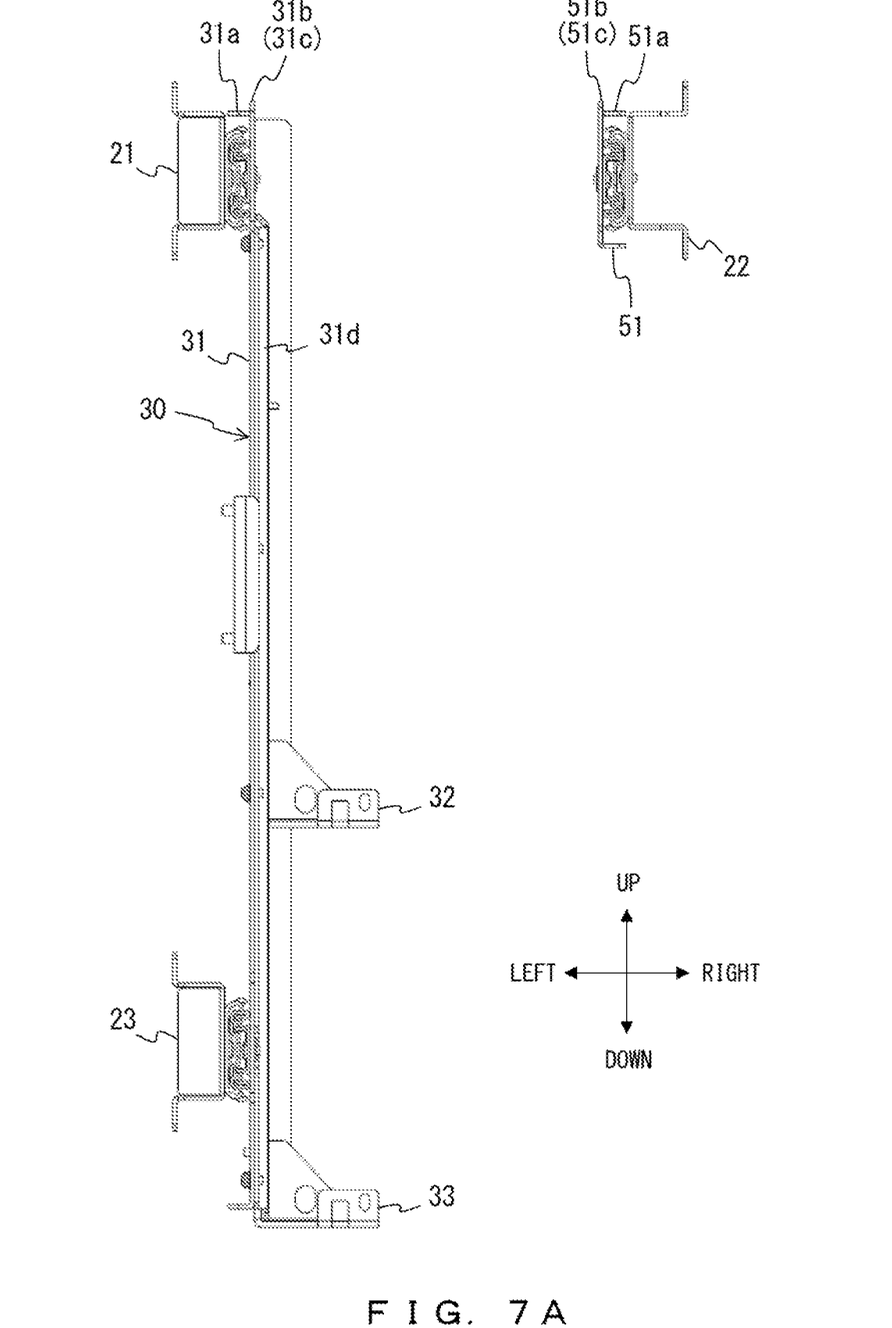
FIG. 7A is an enlarged front view illustrating slide rails in a fully open state.

FIGS. 6A and 7A are a front perspective view and an enlarged front view illustrating the first to third slide rails 21 to 23 in a fully open state.

Figure 6B:
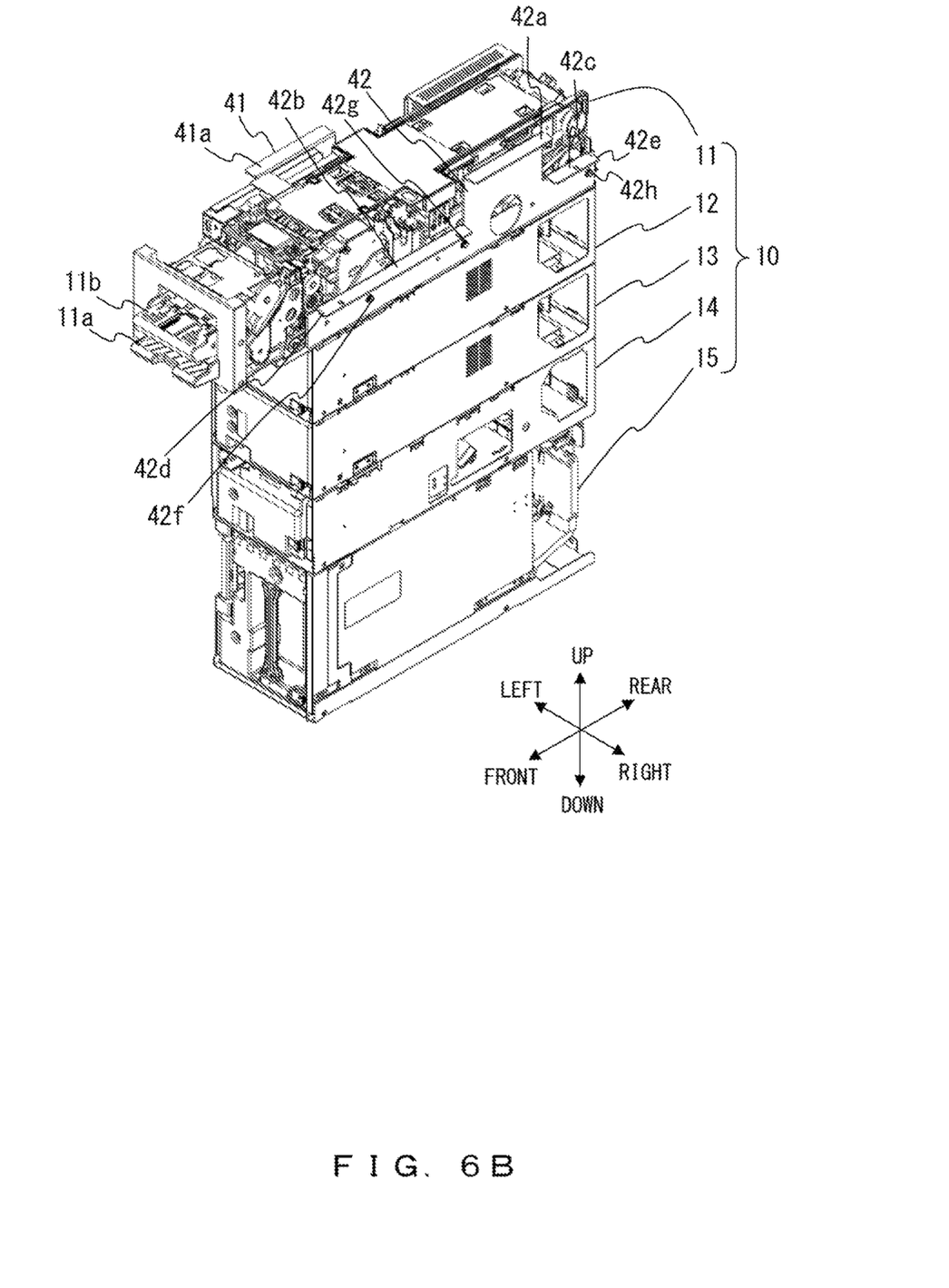
FIG. 6B is a front perspective view illustrating a composite body.
Figure 7B:
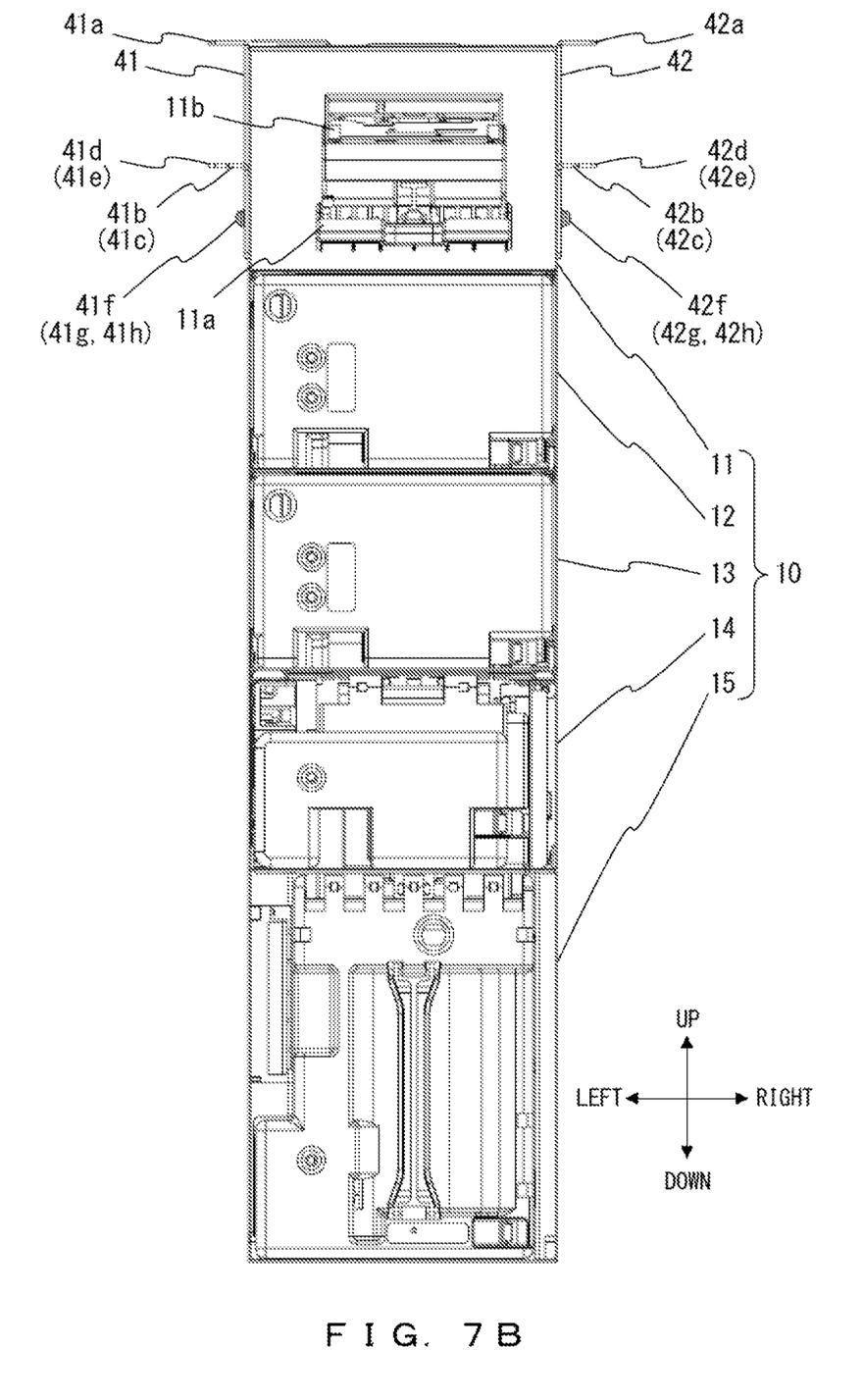
FIG. 7B is an enlarged front view illustrating a composite body.

FIGS. 6B and 7B are a front perspective view and an enlarged front view illustrating the composite body 10.

Figure 6C:
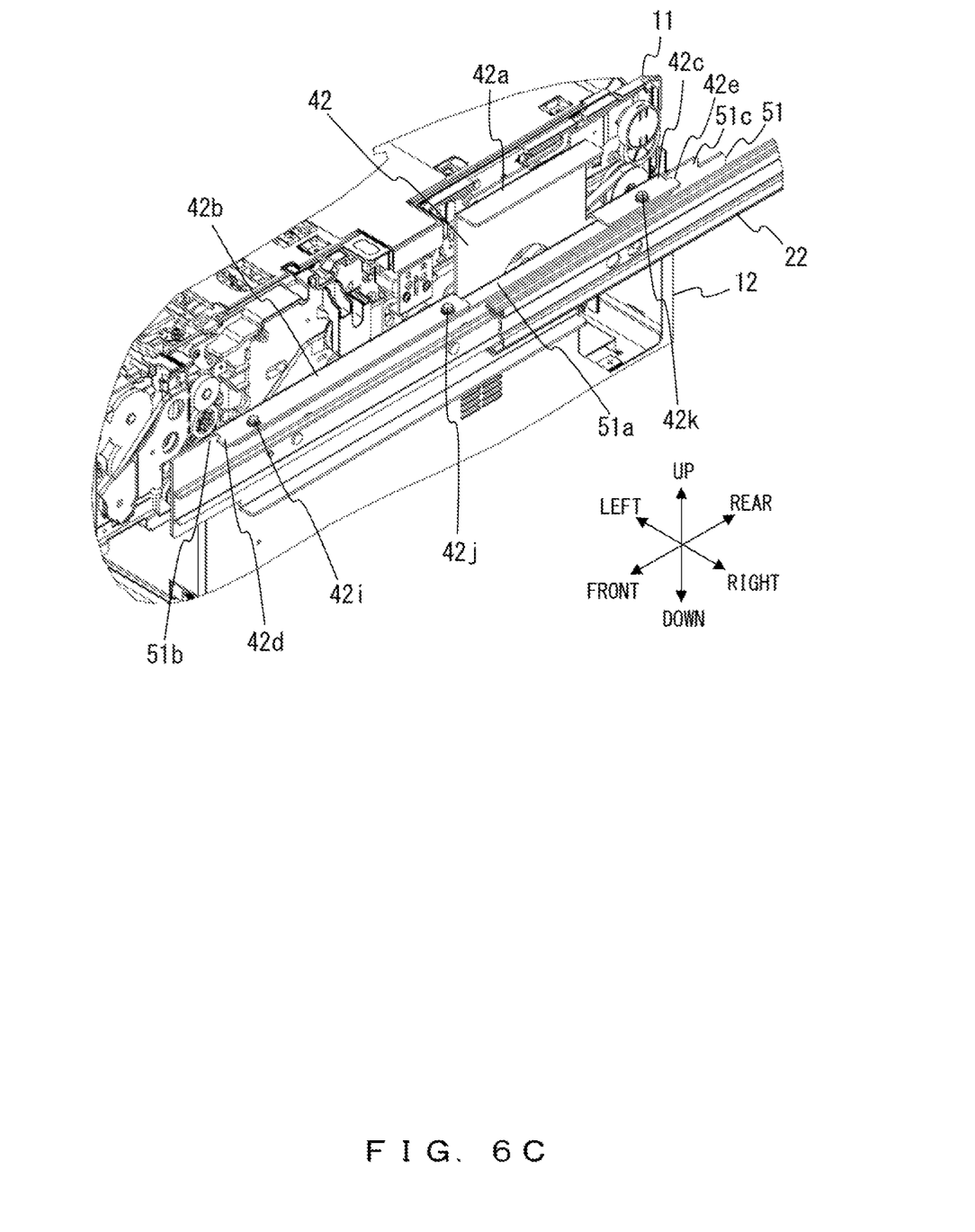
FIG. 6C is a partially enlarged front perspective view illustrating a situation in which a composite body (grip bracket) is placed on slide rails (holding part and placement-reception part)
Figure 7C:
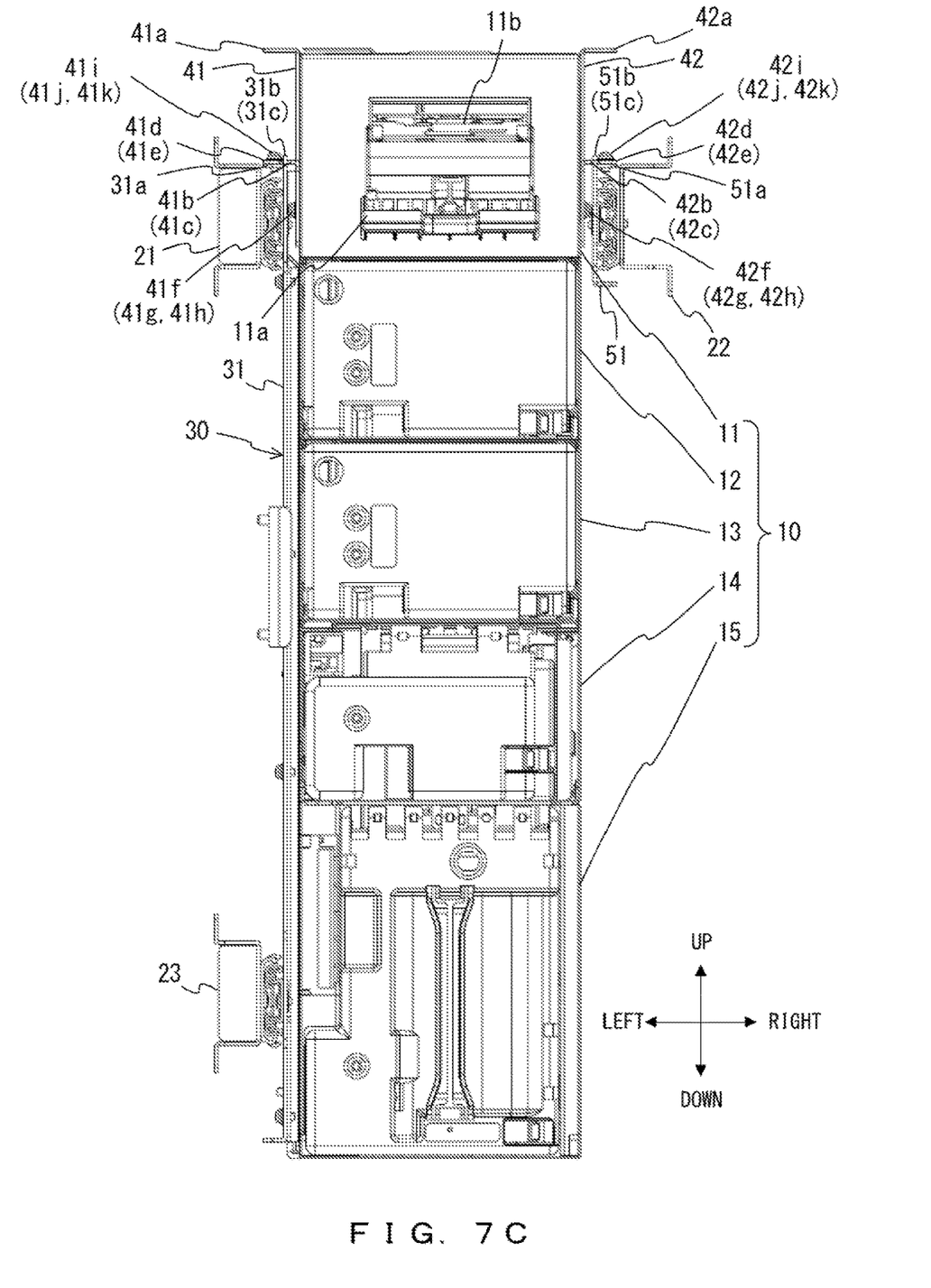
FIG. 7C is an enlarged front view illustrating a situation in which a composite body (grip brackets) is placed on slide rails (holding part and placement-reception part).

FIGS. 6C and 7C are a partially enlarged front perspective view and an enlarged front view illustrating a situation in which the composite body 10 (first grip bracket 41 and second grip bracket 42) is placed on the first slide rail (holding part 30) and the second slide rail 22 (placement-reception part 51).

In a process of assembling the bill reception-ejection apparatus 1 such as the mounting or replacing of the composite body 10, the first grip bracket 41 to be fixed to the left side surface of the first module 11 as depicted in FIGS. 6B and 7B is placed on the holding part 30 depicted in FIGS. 6A and 7A, and the second grip bracket 42 to be fixed to the right side surface of the first module 11 as depicted in FIGS. 6B and 7B is placed on the placement-reception part 51 depicted in FIGS. 6A and 7A. Then, the first grip bracket 41 is fixed to the holding part 30, and the second grip bracket 42 is fixed to the placement-reception part 51, thereby fixing the composite body 10 to the first slide rail 21 and the second slide rail 22.

As depicted in FIGS. 6A and 7A, the placement-reception part 51 is fixed to a portion of the left side surface of the second slide rail 22 on the front end side. As depicted in FIGS. 6C and 7C, the placement-reception part includes a placement-reception surface 51*a* on which placement surfaces 42*b* and 42*c* of the second grip bracket 42 are placed and catching projections 51*b* and 51*c* protruding upward such that catch sections 42*d* and 42*e* provided on the placement surfaces 42*b* and 42*c* can be caught thereon. As depicted in FIG. 7C, the holding part 30 includes, as described above, the placement-reception surface 31*a* on which the placement surfaces 41*b* and 41*c* of the first grip bracket 41 are placed and the catching projections 31*b* and 31*c* protruding upward such that the catch sections 41*d* and 41*e* provided on the placement surfaces 41*b* and 41*c* can be caught thereon. Thus, the holding part 30 not only holds the first to fifth modules 11 to 15 together but also serves as a placement-reception part on which the first grip bracket 41 is placed, as with the placement-reception part 51 on which the second grip bracket 42 is placed.

As depicted in FIG. 7B, the first grip bracket 41 is fixed to the left side surface of the composite body 10 by fixation screws 41f, 41g, and 41h. As depicted in FIGS. 6B and 7B, the second grip bracket 42 is fixed to the right side surface of the composite body 10 by fixation screws 42f, 42g, and 42h.

As depicted in FIGS. 6B and 7B, the second grip bracket 42 includes a grip section 42a that protrudes upward and is bent from the upper edge horizontally rightward, placement surfaces 42b and 42c that are bent horizontally rightward and to be placed on the placement-reception surface 51a of the placement-reception part 51, a catch section 42d that protrudes forward from the right end portion of the placement surface 42b, and a catch section 42e that protrudes rearward from the left end portion of the placement surface 42c. Accordingly, as depicted in FIGS. 6C and 7C, the placement surfaces 42b and 42c are placed on the placement-reception surface 51a of the placement-reception part 51, with the result that the second grip bracket 42 is placed via the placement-reception part 51 on the second slide rail 22 fixed to the placement-reception part 51.

The catch sections 42d and 42e of the second grip bracket 42 are caught on the catching projections 51b and 51c of the placement-reception part 51 so as to prevent the second grip bracket 42 (composite body 10) from being dropped in a width direction (leftward direction) orthogonal to the open-close direction of the first to third slide rails 21 to 23 (front-rear direction).

As depicted in FIG. 7B, the first grip bracket 41 includes a grip section 41a that protrudes upward and is bent from the upper edge horizontally leftward, placement surfaces 41b and 41c that are bent horizontally leftward and to be placed on the placement-reception surface 31a of the left-side-surface holding section 31, a catch section 41d that protrudes forward from the left end portion of the placement surface 41b, and a catch section 41e that protrudes rearward from the left end portion of the placement surface 41c. Accordingly, as depicted in FIG. 7C, the placement surfaces 41b and 41c are placed on the placement-reception surface 31a of the holding part 30, with the result that the first grip bracket 41 is placed via the holding part 30 on the first slide rail 21 fixed to the holding part 30.

The catch sections 41d and 41e of the first grip bracket 41 are caught on the catching projections 31b and 31c of the holding part 30 so as to prevent the first grip bracket 41 (composite body 10) from being dropped in a width direction (rightward direction).

The first grip bracket 41 may be placed directly on the first slide rail 21 without intervention of the holding part 30. The second grip bracket 42 may be placed directly on the second slide rail 22 without intervention of the placement-reception part 51.

As depicted in FIG. 6B, the grip section 41a of the first grip bracket 41 is located forward of the grip section 42a of the second grip bracket 42. Meanwhile, the placement surfaces 41b and 42b of the first grip bracket 41 and the second grip bracket 42 are provided forward of the grip sections 41a and 41b, and the placement surfaces 41c and 42c of the first grip bracket 41 and the second grip bracket 42 are provided rearward of the grip sections 41a and 41b.

As depicted in FIG. 7C, the placement surfaces 41b and 41c of the first grip bracket 41 are fixed to the placement-reception surface 31a of the holding part 30 by fixation screws 41i, 41j, and 41k. As depicted in FIGS. 6C and 7C, the placement surfaces 42b and 42c of the second grip bracket 42 are fixed to the placement-reception surface 51a of the placement-reception part 51 by fixation screws 42i, 42j, and 42k. Accordingly, the composite body 10 is fixed to the first slide rail 21 via the first grip bracket 41 and the holding part 30 and fixed to the second slide rail 22 via the second grip bracket 42 and the placement-reception part 51. Since the third slide rail 23 is fixed to the holding part 30 as described above, the composite body 10 can be considered to be fixed to the third slide rail 23 via the holding part 30.

In the embodiments described above, the bill reception-ejection apparatus 1, i.e., an example of the cash handling apparatus, includes: the composite body 10 that consists of the first to fifth modules 11 to 15 connected to each other, i.e., examples of the plurality of modules; the first to third slide rails 21 to 23, i.e., examples of the slide rails with which the composite body 10 is drawn out of the housing; and the holding part 30 that is fixed to the left side surface and back surface of the composite body 10, i.e., examples of the two or more adjacent surfaces among the four outer surfaces (left side and right side surfaces, front surface, and back surface) of the composite body 10, and holds the first to fifth modules 11 to 15 together.

Accordingly, the holding part 30 can reduce application of a load to the linkages between the first to fifth modules 11 to 15 that could occur due to an impact resulting from an inertial force applied to the modules when opening or closing the first to third slide rails 21 to 23, thereby preventing the linkages between the modules from being broken. The holding part 30 can also reduce swing of the composite body in the left-right direction, thereby preventing the composite body 10 from being broken as a result of striking the inner wall of the housing. Accordingly, embodiments allow for a reduction in the occurrence of breakage of the cash handling apparatus (bill reception-ejection apparatus 1) that includes the slide rails (first to third slide rails 21 to 23).

In embodiments, the first to fifth modules 11 to 15 are connected in the height direction, and the holding part 30 is fixed to the first to fifth modules 11 to 15 (at least the uppermost module and the lowermost module) at the left side surface, i.e., an example of the first surface, among the four outer surfaces (left side and right side surfaces, front surface, and back surface) of the composite body 10 and is fixed to the fourth module 14 and the fifth module 15 (an example of the at least one module) at the back surface, i.e., an example of the second surface adjacent to the first surface, among the four outer surfaces. Accordingly, the linkages between modules that tend to have an impact resulting from an inertial force applied thereto, such as the fourth module 14 and the fifth module 15 that are distant from the first module 11 and indirectly connected to the first slide rail 21 and the second slide rail 22, can be reliably prevented from being broken. When the holding part 30 is fixed only to the left side surface among the left and right side surfaces of the composite body 10, the right side surface of the composite body 10 may be used to perform maintenance of the composite body 10.

In embodiments, the bill reception-ejection apparatus 1 includes only three slide rails: the first slide rail 21 and the second slide rail 22 that are located on opposite sides of the composite body 10 and the third slide 23 located below the first slide rail 21. Thus, swing of the composite body 10 in the left-right direction can be reduced more reliably, thereby more reliably preventing the composite body 10 from being broken as a result of striking the inner wall of the housing. In addition, since no slide rails are disposed over or under the composite body 10, more modules can be connected to the composite body 10 in the height direction.

In embodiments, the first slide rail 21 and the third slide rail 23 are fixed to the holding part 30. Thus, the holding part 30 fixed to the two slide rails can more reliably hold the composite body 10, so that the occurrence of breakage of the bill reception-ejection apparatus 1 can be reduced more effectively.

In embodiments, the first grip bracket 41 and the second grip bracket 42, i.e., examples of the bracket, are fixed to the composite body 10 and placed directly or indirectly on the first slide rail 21 and the second slide rail 22. Accordingly, in the process of assembling the bill reception-ejection apparatus 1 with the composite body 10 placed on the first slide rail 21 and the second slide rail 22, the first grip bracket 41 can be fixed to the holding part 30, the second grip bracket 42 can be fixed to the placement-reception part 51, and the second to fifth modules 12 to 15 can be fixed to the holding part 30. Hence, a single person can assemble the bill reception-ejection apparatus 1 by himself/herself.

In embodiments, the first grip bracket 41 and the second grip bracket 42 include the catch sections 41d, 41e, 42d, and 42e for preventing these brackets from being dropped in the width direction (left-right direction) orthogonal to the open-close direction of the first slide rail 21 and the second slide rail 22, with the brackets placed directly or indirectly on the first slide rail 21 and the second slide rail 22. Accordingly, the composite body 10 (first grip bracket 41 and second grip bracket 42) can be prevented from being dropped (falling) even if the first slide rail 21 or the second slide rail 22 is warped in the width direction.

In embodiments, the first slide rail 21 and the third slide rail 23, i.e., examples of the at least one slide rail, are fixed to the holding part 30, and the first grip bracket 41, i.e., an example of the at least one bracket, is placed on the first slide rail 21 via the holding part 30. Thus, the holding part 30 can also serve as a placement-reception part which is fixed to the first slide rail 21 and on which the first grip bracket 41 is placed, as with the placement-reception part 51 which is fixed to the second slide rail 22 and on which the second grip bracket 42 is placed. Accordingly, the composite body 10 (first grip bracket 41) can be reliably placed on the first slide rail 21 (holding part 30) with the simple configuration in which the holding part 30 holding the first to fifth modules 11 to 15 together is used.

The present invention is not simply limited to the embodiments described herein. Components of the embodiments may be embodied in a varied manner in an implementation phase without departing from the gist of the invention. A plurality of components disclosed with reference to the described embodiments may be combined, as appropriate, to achieve various inventions. For example, all of the components indicated with reference to embodiments may be combined as appropriate. Accordingly, various variations and applications can be provided without departing from the gist of the invention.

The invention claimed is:

1. A cash handling apparatus comprising:
   a composite body that consists of a plurality of modules connected to each other, each of these modules being shaped like a rectangular solid;
   slide rails by which the composite body is drawn out of a housing;
   a plate that is fixed to two or more adjacent surfaces among four outer surfaces of the composite body and holds the plurality of modules together; and
   brackets that are fixed to the composite body and placed directly or indirectly on the slide rails, wherein
   the plurality of modules are connected in a height direction, and
   the plate is fixed to at least an uppermost module and a lowermost module of the plurality of modules at a first surface of the four outer surfaces of the composite body and is fixed to at least one of the modules at a second surface adjacent to the first surface among the four outer surfaces.

2. The cash handling apparatus of claim 1, wherein the slide rails include only three slide rails, the three slide rails being first and second slide rails located on opposite sides of the composite body and a third slide rail located below the first slide rail.

3. The cash handling apparatus of claim 2, wherein the first slide rail and the third slide rail are fixed to the plate.

4. The cash handling apparatus of claim 1,
   wherein
   the brackets include catch sections for preventing the brackets from being dropped in a width direction orthogonal to an open-close direction of the slide rails, with the brackets placed directly or indirectly on the slide rails.

5. The cash handling apparatus of claim 1,
   wherein at least one of the slide rails is fixed to the plate, and
   at least one of the brackets is placed on the slide rail via the plate.

* * * * *